Figure 1:
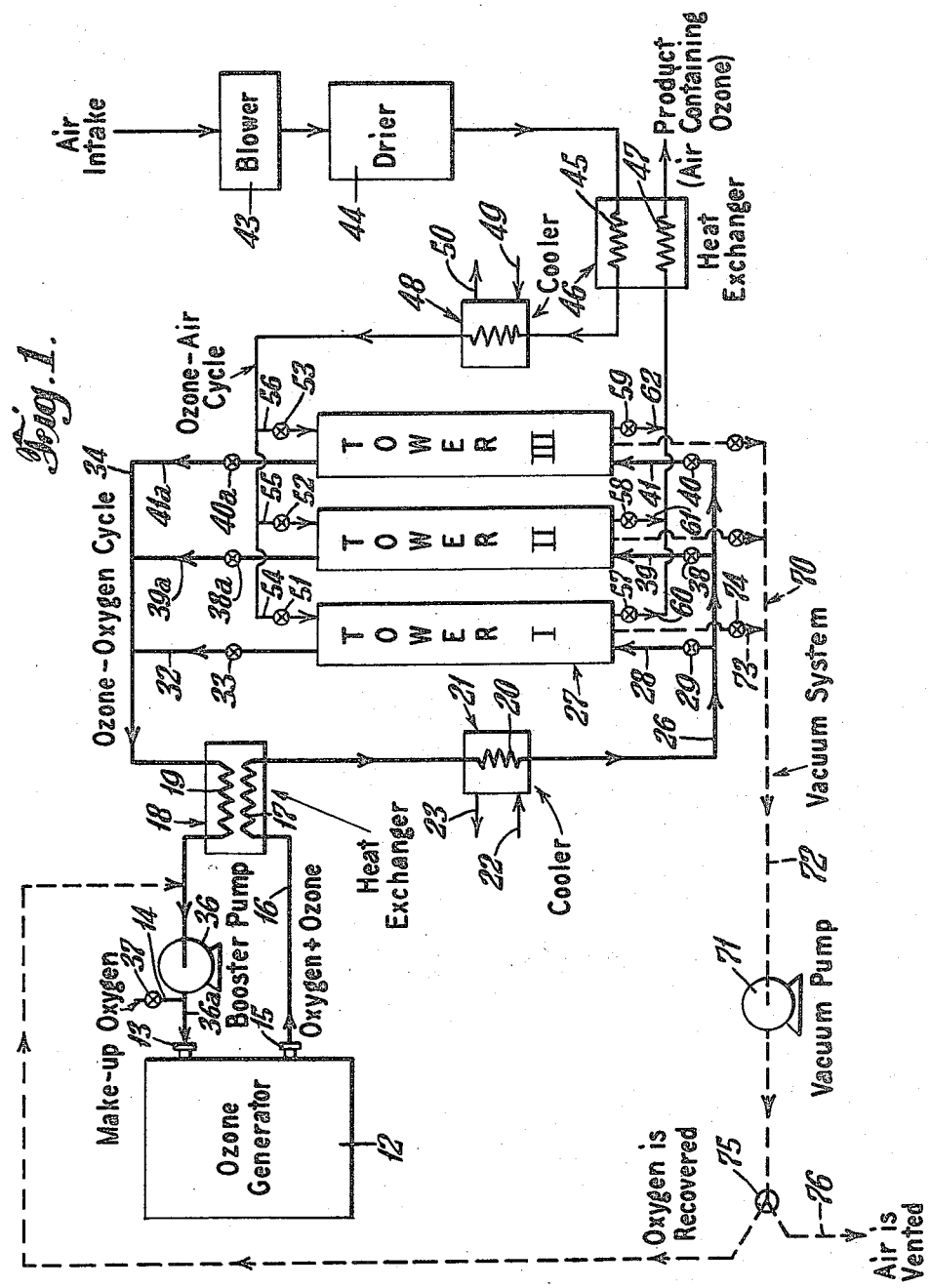

_United States Patent Office_

2,872,397
Patented Feb. 3, 1959

2,872,397

METHOD AND APPARATUS FOR PRODUCING OZONE-CARRIER GAS MIXTURE

Alfred D. Kiffer, Kenmore, N. Y., assignor to Union Carbide Corporation, a corporation of New York Application January 10, 1955, Serial No. 480,841

9 Claims. (Cl. 204—176)

This invention relates to a process and apparatus for the continuous manufacture of ozone from oxygen, and more specifically relates to the incorporation of ozone into a carrier gas which may decrease the hazards of utilizing the ozone.

In the production of ozone from oxygen by the electric discharge process, the use of oxygen, that is, pure oxygen or enriched air containing over about 75 percent oxygen, as a raw material, rather than ordinary air, offers several advantages. For the same investment in ozone generating apparatus, the ozone yield from oxygen is approximately twice as much as from ordinary air, other things being equal. Moreover, greater concentrations of ozone can be produced from oxygen. Further, the operating efficiencies of ozone generating equipment are improved, resulting in less consumption of electrical energy per unit weight of ozone produced.

However, there is a problem in the production of ozone from oxygen. The oxygen is passed through an ozone generator, where it is converted in part into ozone. The concentration of ozone in the ozone-oxygen gas product is relatively low, usually being of the order of only one or two percent ozone, and seldom over six percent. Because so much oxygen must be used to manufacture a relatively small amount of ozone, the savings effected by using oxygen instead of air may be nullified unless there is some means of recycling the oxygen to the ozone generator.

Another problem is in the utilization of ozone diluted by oxygen. If the ozone-oxygen gas mixture is used to react with a material dissolved in an organic solvent, the vapors of the solvent may form an explosive mixture with the oxygen carrier gas. This mixture may be ignited by a static spark or other means. Very destructive explosions may thus take place.

Yet another problem in the utilization of ozone-containing gas mixtures of which oxygen is a component is that such oxygen very often detracts from the very purpose to which the ozone gas mixture is to be applied. That is, while in some instances the ozone component may beneficially react with a raw material to produce a desired result, the oxygen component on the other hand reacts with the raw material to give useless products, thus wasting the raw material, which in some instances is very valuable.

It is, therefore, an important object of the present invention to provide a system for the manufacture of ozone gas, having improved features of economy and safety.

Another important object of the invention is to provide in the manufacture of an ozone-containing gas from oxygen, a method and apparatus for producing an ozone-carrier gas mixture which is relatively safe and cheaper to produce than any heretofore known.

Yet another object of the invention is to provide in the manufacture of ozone from oxygen a cyclic system wherein the ozone and oxygen components may be separated from each other by adsorption, and the separated oxygen recycled to the ozone generator.

Yet another object of the present invention is to provide a method of reducing the oxygen content of a crude ozone gas mixture to a level safe for subsequent ozonation, comprising selectively adsorbing ozone out of said gas mixture and thereafter desorbing said adsorbed ozone, using a desorbing gas having a relatively low oxygen content.

Still another object of the invention is to provide a novel and relatively safe gaseous composition comprising ozone and a carrier gas containing little or no oxygen, said carrier gas being substantially non-reactive with ozone.

Figure 2:
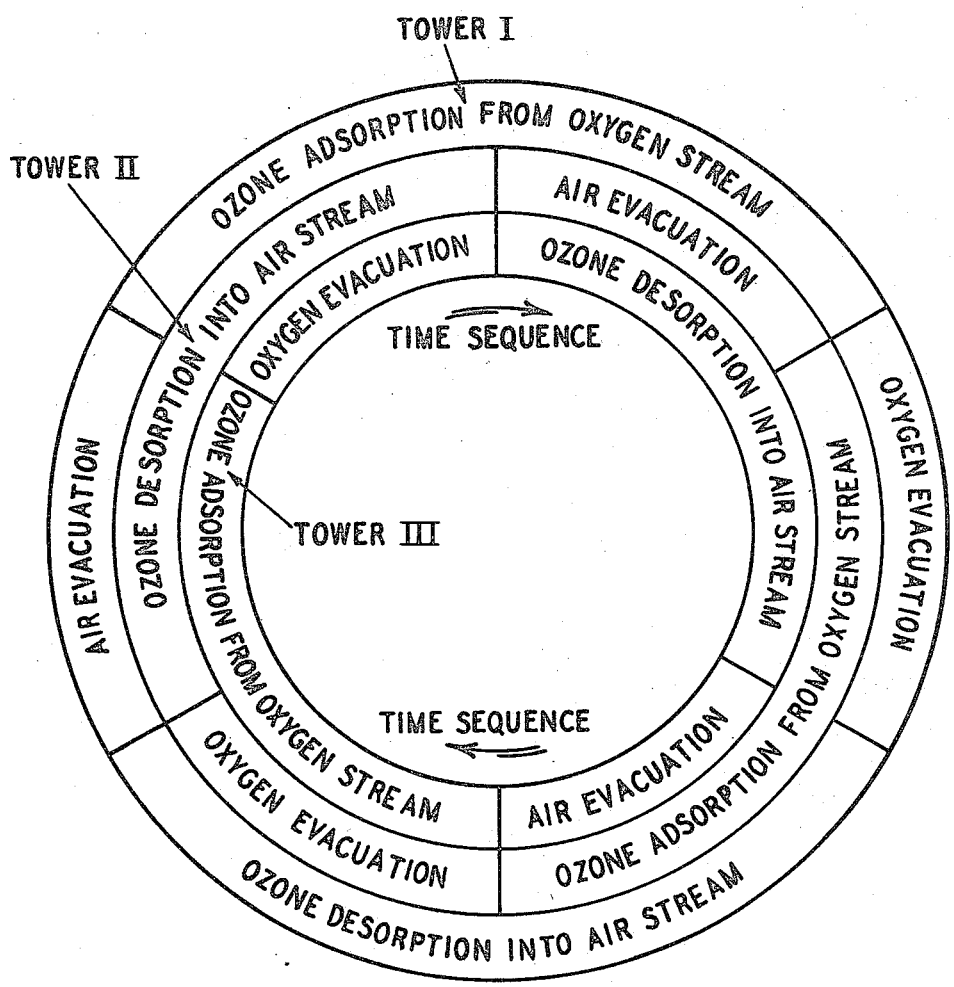

In the drawings:

Fig. 1 illustrates a flow diagram of apparatus embodying the principles of the present invention; and Fig. 2 is a diagrammatic representation of the time cycle employed in the apparatus shown in Fig. 1.

According to my invention, the above objects may be accomplished in my novel ozone manufacturing system. In this system, oxygen is converted in part into ozone, and the resultant gas mixture, consisting mostly of oxygen and a relatively small percentage of ozone, is passed through a bed of adsorbent material such as silica gel. The ozone is selectively adsorbed, and the remaining oxygen recycled. The recycled oxygen is replenished with make-up oxygen in an amount substantially equal to that which was previously converted to ozone. Two or more adsorbing vessels are used, so that when the adsorbent in one vessel reaches the practical limit of its sorptive capacity at the temperature employed, the ozone containing gas to be treated may be passed to another of the adsorbing vessels containing a charge of adsorbent material. While the gaseous mixture is being treated in the second vessel, the ozone in the first vessel is removed from the adsorbent, using as a stripping gas either helium, air, nitrogen, argon, carbon tetrafluoride, trifluorochloromethane, dichlorodifluoromethane, carbon dioxide or other desirable diluent gas, including the volatile halogenated hydrocarbons, which then acts as a carrier gas for the ozone, thus making the ozone mixture safer in subsequent contacts with organic matter than mixtures of ozone rich in oxygen. Thus, the adsorption and desorption steps are continuously performed, although each individual adsorbing vessel is included only intermittently in the adsorption and desorption cycles.

One embodiment of this invention is illustrated in Fig. 1. Referring to this figure, there is shown an ozone generator 12, provided with an oxygen gas inlet 13 for the reception of pure oxygen from an oxygen supply conduit 14, and a gas outlet conduit 15 for the discharge of an ozone-oxygen gas mixture to be treated in the apparatus of the invention. The ozone and oxygen gas flow cycle is shown in Fig. 1 by a heavy solid line, the arrows indicating the direction of flow. The preferred pressure is between 0 and 15 lb./sq. in. gage.

According to the invention, it has been found that ozone may be selectively adsorbed from a gas mixture of ozone and oxygen by passing the gas mixture through a bed of granular adsorbent material, preferably commercially pure silica gel, at a relatively low temperature. Other adsorbents may be used in the practice of the invention, for example, silica gel containing alumina or other ingredients which are not catalysts for ozone decomposition. The adsorption temperature may be between −80° C. and +20° C., preferably between −20° C. and 0° C.

To achieve the preferred temperature, the ozone-oxygen gas mixture emanating from outlet 15 is precooled in one or more stages to the desired separation temperature before it enters the adsorbing equipment. This is accomplished by introducing the gas mixture through conduit 16, which connects the ozone generator outlet 15 with a tube 17 in a heat exchanger 18. The gas in the tube 17 is cooled by heat exchange with cold counter-flowing oxygen in tube 19 in said heat exchanger.

Prior to entering the adsorber equipment, the ozone-oxygen gas is further cooled in a cooling coil 20 in an externally-refrigerated cooler 21. An inlet conduit 22 and an outlet conduit 23 in the cooler 21 permit the circulation of refrigerant inside the cooler.

The cooled ozone-oxygen gas mixture is sent into a manifold 26, and enters an adsorber 27 through a connecting branch line 28 at one end thereof. A valve 29 in the branch line 28 controls the flow of gas into the adsorber 27.

The absorber 27 may be of conventional construction, comprising a vertical, elongated adsorbing vessel or tower, which may be provided with one or more vertically spaced trays or supports (not shown), or any other suitable means for holding the adsorbent bed of silica gel. Substantially all of the ozone in the gas mixture entering the tower remains on the silica gel. The separated oxygen leaves the adsorber tower 27 through an oxygen gas discharge pipe 32, provided with a valve 33. The pipe 32 terminates in a return manifold 34, which is joined to the tube 19 in the heat exchanger 18. A duct 35 joins the tube 19 to the inlet side of the booster pump 36. The outlet of the booster pump communicates with inlet 13 via duct 36a. The oxygen charged may be replenished with make-up oxygen through valve 37 in conduit 14, joined to duct 36a, in an amount substantially equal to that previously converted to ozone.

In order to provide a continuous process for manufacturing ozone, multiple adsorbing towers piped in parallel are employed. Any number of adsorbing towers may be used, three being preferred and illustrated in the accompanying drawings and designated as towers I, II and III, each of said towers being in all respects similar and provided with identical piping features. As soon as the silica gel adsorbent in tower I allows any ozone to break through, the gas to be treated is passed to either one of the adjoining towers by shutting valves 29 and 33 in tower I by manual or automatic means and either opening valves 38 and 38a in tower inlet line 39 and outlet line 39a, respectively, in tower II, or opening valves 40 and 40a in lines 41 and 41a, respectively, in tower III.

As an important feature of the present invention, there is provided a cyclic system for continuously recovering ozone from the adsorbing towers and at the same time reactivating the adsorbent in the tower for subsequent adsorbing operation. This is accomplished by cutting off the flow of gas to be treated in one tower, and then blowing stripping gas which also serves as a carrier gas, such as air, nitrogen, argon, helium, carbon tetrafluoride, trifluorochloromethane, dichlorodifluoromethane or carbon dioxide, air being shown in the drawings for purposes of illustration, through the silica gel adsorbent to carry off the previously adsorbed ozone.

Prior to entering the silica gel tower, the stripping gas, air, whose flow is depicted in Fig. 1 by a light solid line, is cleansed of impurities, dried, and cooled to the temperature of the tower. For this purpose the air is conventionally screened and filtered in the air intake. The screened and filtered air is then forced under appropriate pressure by a blower 43 into a drier 44 where the moisture content is substantially reduced to the point where it will not affect the adsorbing characteristics of the silica gel. Thereafter, the air is passed through a cooling tube 45 in a heat exchanger 46, where refrigeration in the ozone product in tube 47 is recuperated.

The air is then further cooled in a cooler 48 having inlet and outlet conduits 49 and 50 respectively, for the flow of refrigerant therethrough.

The thus cleaned and dried air is now available to purge the silica gel adsorbent of its ozone content, and to act as a carrying medium for the ozone. This is accomplished in a continuous manner by suitably controlling the air flow through the towers I, II and III, by properly manipulating inlet valves 51, 52 and 53 in tower inlet lines 54, 55 and 56, respectively, and outlet valves 57, 58 and 59 in tower outlet lines 60, 61 and 62, respectively.

It will be recognized that in switching the silica gel towers from adsorption operation to desorption operation, there is an initial period in which the tower is filled with residual oxygen from the preceding operation. As a result, the ozone product discharged from the tower would initially be contaminated with oxygen, which might present a hazard.

To avoid the possibility of this contamination of the ozone-air gas product by the residual oxygen in the tower, the oxygen may be exhausted from the tower immediately following the adsorption operation and prior to the desorption step. Referring to tower I, upon terminating the adsorption operation, valves 29 and 33 are closed, and the residual oxygen in the tower is sufficiently evacuated by a vacuum system 70 provided with a vacuum pump 71 in a vacuum line 72, having a branch connection 73 coming from tower I. The vacuum flow system is shown in Fig. 1 as a broken line. By means of valve 74 in branch line 73, and a three-way valve 75 in vacuum line 72, the evacuated oxygen is recovered and returned to the ozone generator via the booster pump 36. Whatever ozone may be included in the evacuated gas stream in line 72 is carried along with the evacuated oxygen, and, for all intents and purposes, passes unchanged through the ozone manufacturing operation.

It will be further noted that, following the reactivation of the adsorbent, residual air (or other carrier gas) remains in the tower. When the tower is switched to adsorption operation, the nitrogen in this residual air would contaminate the oxygen emerging from the tower, and thus impair the efficiency of the ozone generator.

Because of the possibility of deleterious nitrogen contamination of the recycled oxygen immediately following the desorption operation, the air content of the tower is removed by evacuating it into the vacuum system 70. By switching the three-way valve 75, the evacuated air may be conveniently diverted from the oxygen return line, and vented to the atmosphere as indicated at 76 in Fig. 1.

By the use of suitable sequence-time control apparatus, solenoid valves, and other control equipment, all the steps described above may be carried out automatically, if so desired.

Fig. 2 diagrammatically shows a convenient time cycle which may be used for the continuous adsorption and desorption in the apparatus of the invention. For example, while ozone is being adsorbed from the ozone-oxygen stream in tower I, the remaining towers may be engaged either in ozone desorption or air evacuation or oxygen evacuation. As illustrated in Fig. 2, during the first half of the ozone adsorption process in tower I, the adsorbent in tower II undergoes desorption, and tower III passes through its oxygen evacuation phase. During the second half of the ozone adsorption step in tower I, air evacuation takes place in tower II and ozone desorption is commenced in tower III. Following the ozone adsorption operation, tower I undergoes the sequential step of oxygen evacuation, ozone desorption, and air evacuation. At the same time, the operations conducted in the remaining towers are coordinated with each other, so that at all times a continuous extraction of ozone by adsorption from a stream of ozone-oxygen gas and a continuous transfer of ozone by desorption into a stream of air carrier gas is effected.

While in the foregoing there has been shown and described the preferred embodiment of this invention, it is to be understood that minor changes in the details of construction and arrangement of parts may be resorted to without departing from the spirit and scope of the invention. For example, in lieu of three towers arranged in parallel, additional towers may be provided to insure continuity of operation in the event of break-down or repair of one of the towers. The additional towers may be arranged in parallel, or may be joined in series with any of the existing towers or both, and provided with suitable bypasses. Thus within the existing parallel arrangement, tower I may be replaced with two or more series-connected towers.

While the embodiment of the invention described and illustrated hereinabove refers to stationary beds of silica gel, it is not intended that the scope of the invention be limited thereto. The apparatus of the invention is also susceptible of use in systems employing moving beds of adsorbent material.

Another modification of the invention may lie in the cycle itself. For instance, instead of evacuating the oxygen between the adsorption and the desorption steps, the silica gel may be purged with air and vented to the atmosphere. Similarly, instead of evacuating the air following the desorption step, the air may be expelled by oxygen, and vented to the atmosphere. These modifications have the advantage of eliminating the need for the vacuum system.

In another modification, the ozone desorption step may be carried out by applying a high vacuum to the silica gel tower. In such case, the gas product would be substantially pure ozone, which may if so desired be used in concentrated form, or subsequently diluted with a suitable carrier gas.

Alternatively, the ozone adsorption can be carried out at a pressure substantially above atmospheric pressure. The oxygen evacuation step in this case could then be carried out by simply venting the tower to the atmosphere. In similar manner, the ozone desorption can be performed at superatmospheric pressures. After the desorption, the air evacuation steps may then be performed according to the preferred practice of the invention as described hereinabove or by venting the tower to the atmosphere.

All equipment used in the manufacture and handling of ozone should be kept free of hydrocarbon lubricants and other contaminants not safely compatible with gas mixtures containing ozone and oxygen in the interests of safety.

The choice of carrier gas will depend upon the subsequent use to be made of the ozone. Air may be used when feasible because it is cheapest, but if it be desired to have substantially no oxygen in the carrier gas, then nitrogen or argon or other gases non-reactive with ozone may be used.

The system described in this specification is usually employed with relatively low zone concentrations, i. e., less than about 10 mole percent. However the system could be adapted to higher concentrations of ozone with the realization that at higher concentrations there appears the danger of explosive decomposition of the ozone.

From the above description it will be seen that the apparatus of the present invention provides an improved system for manufacturing an ozone-carrier gas mixture from oxygen. The ozone-oxygen gas mixture which results from the passage of oxygen through the ozone generator is separated into its constituents, oxygen and ozone, through the utilization of the selective adsorption properties of silica gel for ozone under specified conditions. The improved apparatus of the invention results in greater efficiencies, which are obtained in the present ozone manufacturing cycle by recycling the separated oxygen. In addition, the hazard normally encountered in the handling of ozone in the presence of a high concentration of oxygen is substantially reduced by reason of the dilution or elimination of the oxygen in the carrier gas. This is accomplished in the invention by desorbing the silica gel of its ozone content, using as a stripping gas either air, nitrogen, argon, helium or other suitable diluent, the stripping gas acting as a carrier gas, and affording added safety to the handling of the ozone-carrier gas mixture. The continuity of the adsorbing and the desorbing operations is achieved through the use of multiple adsorption and desorption zones, which permit reactivation of the adsorbent in one zone while the adsorbent in another zone is in use.

Variations and modifications may also be made in such items as the length or configuration of the absorbing tower, the rate of flow of the gas to be treated, the ozone carrier gas, the composition of the adsorbent, the temperature at which adsorption or desorption is performed, and the means by which desorption is effected in the cycle of the invention, without departing from the scope of the invention.

What is claimed is:

1. A method of producing $O_3$ from $O_2$, comprising passing the oxygen through an ozone generator to produce a gas mixture of ozone in an oxygen carrier gas, cooling said gas mixture, flowing said cooled gas mixture through an adsorption zone containing as an ozone adsorbent, silica gel, removing from the adsorption zone substantially all of said oxygen carrier gas, replenishing said oxygen carrier gas with make-up oxygen in an amount substantially equal to that converted to ozone, and circulating said oxygen carrier gas and said make-up oxygen through said ozone generator, and desorbing by vacuum the ozone adsorbed on said adsorbent.

2. In the production of ozone product gas containing a minimum amount of oxygen, the method comprising charging an ozone generator with a stream of oxygen to produce a stream of gas mixture containing ozone in an oxygen carrier gas, cooling said gas mixture, flowing said cooled gas mixture through an adsorption zone containing silica gel as an adsorbent for selectively adsorbing ozone from said gas mixture, removing from the adsorption zone said oxygen carrier gas, replenishing said oxygen carrier gas with make-up oxygen in an amount substantially equal to that converted to ozone, circulating said oxygen carrier gas and said make-up oxygen through said ozone generator, partially evacuating said adsorption zone to remove residual oxygen gas therefrom, recirculating said evacuated oxygen to said ozone generator, passing at least one desorbing gas from the class consisting of air, nitrogen, argon, helium, carbon tetrafluoride, trifluorochloromethane, dichlorodifluoromethane and carbon dioxide through said adsorbent to desorb the adsorbed ozone therefrom and incorporate said ozone in said desorbing gas, removing ozone product gas from said zone, evacuating said zone of desorbing gas to prepare said zone for subsequent ozone adsorption from said stream of ozone-oxygen gas mixture, and providing additional zones for the continuous flow of the ozone-oxygen gas mixture through alternate adsorption zones whereby ozone product gas is continuously removed from each of said adsorption zones in turn.

3. In a system for manufacturing ozone in an oxygen carrier gas and dispensing ozone in a carrier gas having substantially less oxygen, an ozone generator for converting a supply of oxygen into an ozone-oxygen gas mixture, said ozone generator having an oxygen gas inlet and an oxygen-ozone gas outlet, a cooling compartment in communication with said gas outlet, a silica gel adsorption column, a conduit outlet from said cooling compartment to transfer cooled oxygen-ozone gas mixture to said column, a column discharge line connected to said cooling compartment for passing cool separated oxygen from said column in heat exchange relationship with said oxygen-ozone gas mixture therein, a recycle line connecting said cooling compartment with said oxygen inlet for recycling oxygen, an oxygen supply line connected with said oxygen inlet for replenishing the supply of oxygen in said system, and means for desorbing the ozone component with a gas selected from the group consisting of air, nitrogen, argon, helium, carbon tetrafluoride, trifluorochloromethane, dichlorodifluoromethane and carbon dioxide.

4. An apparatus for treating a dilute ozone gas mixture containing a carrier gas of oxygen, comprising an enclosed compartment at a reduced temperature containing a bed of silica gel, an inlet to said compartment for admitting said dilute ozone gas therein, an outlet for removing the oxygen component in said dilute ozone gas from said compartment, a conduit in communication with the compartment for introducing therein an ozone desorbing gas from the class consisting of air, nitrogen, argon, helium, carbon tetrafluoride, trifluorochloromethane, dichlorodifluoromethane and carbon dioxide, and a product discharge line for removing an ozone gas product containing said desorbing gas as a carrier, said inlet, outlet, conduit and discharge line each having valve control means whereby opening of said inlet and outlet valves allows the entry of said dilute ozone gas into said compartment and the passage of oxygen carrier gas therethrough, and closing said inlet and outlet valves and opening said conduit and discharge valves, allowing the entry of desorbing gas into said compartment and the passage therefrom of said product gas.

5. In the apparatus of claim 4, a vacuum line in communication with the interior of said compartment for evacuating said compartment of oxygen carrier gas and desorbing carrier gas prior to the respective entry of the desorbing gas and the dilute ozone gas.

6. In the apparatus of claim 5, heat exchange means for precooling a stream of said desorbing gas by a counter-flowing stream of said product gas, and a cooling apparatus for further cooling said desorbing gas to the approximate temperature of said compartment prior to the admission of said desorbing gas into said compartment.

7. In the apparatus of claim 6, a heat exchanger for pre-cooling a stream of said dilute ozone gas against a counter-flowing stream of said oxygen component, and further cooling means for reducing the temperature of said dilute ozone gas to approximately the temperature inside said compartment prior to its entry therein.

8. In the apparatus of claim 7, an ozone generator for producing said stream of dilute ozone gas from oxygen and a conduit in communication with said ozone generator and said heat exchanger for recycling said oxygen component from said heat exchanger into said ozone generator.

9. In the apparatus of claim 8, a plurality of columns similar to said first mentioned column, each column having corresponding inlet, outlet, conduit and discharge lines and valve control means, said columns being disposed in parallel connection, whereby dilute ozone gas is continuously delivered in alternating order to each of said columns and ozone product gas is continuously removed from each column in turn.

References Cited in the file of this patent

UNITED STATES PATENTS

| | | |
|---|---|---|
| 361,923 | Brin | Apr. 26, 1887 |
| 511,330 | Fahrig | Dec. 26, 1893 |
| 577,523 | Andersson et al. | Feb. 23, 1897 |
| 1,265,892 | Eustis | May 14, 1918 |
| 1,548,280 | Ray | Aug. 4, 1925 |
| 2,038,562 | Harvey | Apr. 28, 1936 |
| 2,088,814 | Schmalenback | Aug. 3, 1937 |
| 2,119,721 | Richardson | June 7, 1938 |
| 2,519,874 | Berg | Aug. 22, 1950 |
| 2,663,626 | Spangler | Dec. 22, 1953 |
| 2,704,274 | Allison | Mar. 15, 1955 |
| 2,747,681 | Schuftan et al. | May 29, 1956 |
| 2,762,452 | Gains | Sept. 11, 1956 |
| 2,799,362 | Miller | July 16, 1957 |

OTHER REFERENCES

Thorpe's "Dictionary of Applied Chemistry," 4th ed., vol. IX, Longman's Green & Co., pages 194–195.

Mantell: "Adsorption," 1st. ed., McGraw-Hill Book Co., page 12.